Nov. 21, 1933.   J. H. DE BOER   1,935,699
ELECTRIC DISCHARGE TUBE FOR THE EMISSION OF RAYS
Filed July 9, 1930
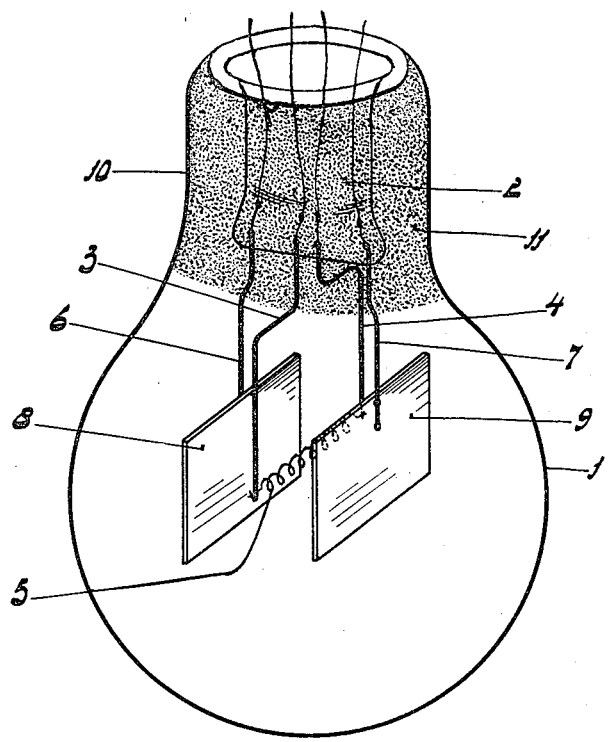
Inventor.
Jan Hendrik De Boer.
By.
Attorney.

Patented Nov. 21, 1933

1,935,699

UNITED STATES PATENT OFFICE 1,935,699

ELECTRIC DISCHARGE TUBE FOR THE EMISSION OF RAYS

Jan Hendrik de Boer, Eindhoven, Netherlands, assignor, by mesne assignments, to General Electric Company, a corporation of New York Application July 9, 1930, Serial No. 466,863, and in the Netherlands September 27, 1929

6 Claims. (Cl. 250—35)

The invention relates to electric discharge tubes for the emission of rays, for example, ultraviolet rays, said tubes containing a substance whose vapour takes part in the discharge. In using discharge tubes of this type often the drawback is encountered that the vapour of the substance taking part in the discharge deposits on that part of the tube wall intended for the passage of the rays to be emitted. This may cause a considerable decrease of the permeability of this wall portion to said rays, so that the efficiency of the discharge tube may be correspondingly reduced.

Now the object of the invention is to obviate this drawback and to provide a discharge tube, in which there does not occur any undesired deposition of the substance taking part in the discharge.

In a discharge tube according to the invention serving for emitting rays and comprising a substance whose vapour takes part in the discharge, a material capable of adsorbing said substance and of liberating the latter again by heating is provided on a part of the tube wall other than that through which the rays pass. Since the vapour pressure of the substance adsorbed is smaller than that of the substance when in a nonadsorbed state, said substance tends to penetrate into the adsorbing material and will not deposit on other parts of the discharge tube.

Whenever there is mentioned in this application of materials adsorbing the substance taking part in the discharge, the same also include materials capable of absorbing said substance.

The invention will be more clearly understood by reference to the accompanying drawing, representing by way of example one embodiment of the invention.

The discharge tube shown in the drawing comprises a wall 1 made of a material which allows the passage of ultraviolet rays, for example, quartz, to which a stem or press 2 is sealed. This stem has attached to it the pole wires 3 and 4 of the incandescent cathode 5. The latter consists of a coiled wire and may be coated to advantage with a highly electron emitting material, for example, an alkaline-earth metal oxide. By means of pole wires 6 and 7 the anodes 8 and 9 which are constituted by rectangular metal plates are mounted on the stem 2. The constricted portion 10 of the discharge tube contains a quantity of adsorbing material 11, which may be applied to the inner wall of the part 10 of the discharge tube, for example, before the sealing of the stem. This material may either consist, for example, of finely divided carbon or of the so-called highly active adsorption carbon.

The discharge tube contains a quantity of a substance such as iodine which may take part in the discharge, so that the tube permits of generating ultraviolet rays. Due to the presence of the adsorbing material provided in the part 10 of the discharge tube the substance taking part in the discharge will not deposit on the globular part of the envelope, so that the permeability of this wall portion serving for the passage of the rays to be emitted is not reduced by a deposit of the iodine. In addition the material constituting the globular wall portion of the discharge tube is prevented from being attacked by said substance which might give rise to a decrease of the permeability of this wall portion. When the tube is out of operation and the adsorption material is unsaturated then the iodine will almost completely be adsorbed by the material 11. Thereby the pressure of the vapour contained in the discharge tube will be smaller than the normal vapour pressure of the substance. Upon operating the tube the adsorbing material will be heated by the discharge, due to which part of the adsorbed substance will be liberated, so that the latter may take part again in the discharge.

Other materials adapted to be used for adsorbing iodine are, for example, calcium fluoride and zirconium oxide.

If the tube contains mercury vapour then one may avail himself to advantage of the adsorbing properties of gold which may be introduced into the tube in form of a foil. The gold and the mercury form an amalgam which has a lower mercury vapour pressure than free mercury.

In the case of sodium vapour being introduced into the tube use may also be made of calcium fluoride or carbon as adsorbing material.

What I claim is:

1. An electric discharge tube for the emission of rays, comprising an envelope having at least two cooperating electrodes one of which is a thermionic cathode, sealed therein, a substance in whose vapor the discharge takes place and the spectrum of which is emitted by the tube, and a material capable of adsorbing said substance and of liberating it again on being heated, said material being provided in said tube at a point removed from the part of the tube wall through which the rays pass and at a point subjected to heat of the discharge between said electrodes.

2. An electric discharge tube for the emission of rays, comprising an envelope having at least two cooperating electrodes one of which is a thermionic cathode, sealed therein, iodine in whose vapor the discharge takes place and a material capable of adsorbing iodine and of liberating iodine again on being heated, said material being provided in said tube at a point removed from the part of the tube wall through which the rays pass and at a point subjected to heat of the discharge between said electrodes.

3. An electric discharge tube emitting ultra-violet rays, comprising an envelope having at least two cooperating electrodes, one of which is a thermionic cathode sealed therein and iodine in whose vapor the discharge takes place, the wall of said tube being at least partly transparent for ultra-violet rays, and a material capable of adsorbing iodine and of liberating iodine on being heated, said material being provided in the tube at a point removed from the part of the tube wall through which the rays pass and at a point subjected to heat of the discharge between said electrodes.

4. An electric discharge tube for the emission of rays, comprising an envelope having at least two cooperating electrodes, one of which is a thermionic cathode, sealed therein, iodine in whose vapor the discharge takes place and carbon adapted to adsorb iodine and to liberate it on being heated, said carbon being provided in the tube at a point removed from the tube wall through which the rays pass and at a point subjected to heat of the discharge between said electrodes.

5. An electric discharge tube for the emission of rays comprising an envelope having at least two cooperating electrodes one of which is a thermionic cathode, sealed therein and a substance in whose vapor the discharge takes place and the spectrum of which is emitted by the tube, the wall of said tube including a neck portion, and a material capable of adsorbing said substance and of liberating it on being heated, said material being provided on the inner side of said neck portion and at a point subjected to heat of the discharge between said electrodes.

6. An electric discharge tube emitting ultra-violet rays comprising an envelope having an incandescent thermionic cathode, two anodes and iodine in whose vapor the discharge takes place, the wall of the tube being at least partly transparent for ultra-violet rays, said wall comprising a neck portion, and carbon disposed on the inner side of said neck portion and at a point subject to heat of the discharge between said electrodes.

JAN HENDRIK DE BOER.